INVENTOR.
CLEMENS F. STRAUGHAN
BY Head & Johnson
ATTORNEYS

INVENTOR.
CLEMENS F. STRAUGHAN

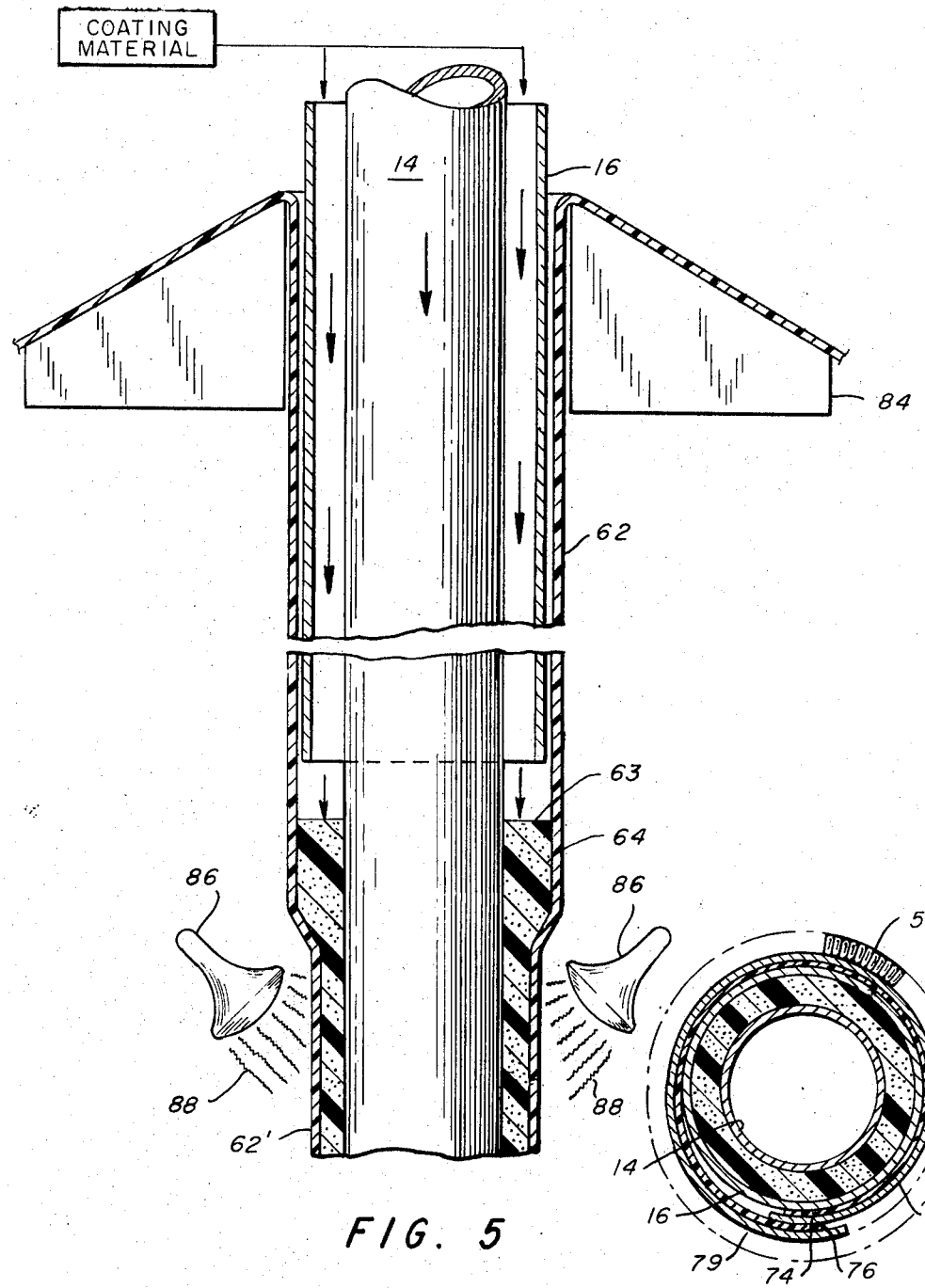

United States Patent Office 3,813,272
Patented May 28, 1974

3,813,272
METHOD AND APPARATUS FOR SIMULTANEOUSLY APPLYING TO AN EXTENDED CYLINDRICAL OBJECT A COATING AND A PLASTIC FILM WRAPPING TO RETAIN THE COATING
Clemens F. Straughan, Tulsa, Okla., assignor to CFS Corporation, Tulsa, Okla.
Filed May 12, 1971, Ser. No. 142,452
Int. Cl. B29c 24/00
U.S. Cl. 156—468    9 Claims

ABSTRACT OF THE DISCLOSURE

This invention involves the method and apparatus for simultaneously placing a coating of a selected material on the outer surface of an extended cylindrical object such as a pipe or conduit, and holding the coating in position by wrapping the coating with a strip of thin film formed to a cylindrical contour and sealed with a longitudinal seam. This is accomplished by inserting the pipe through a tubular concentric mandrel, wrapping and sealing the plastic film against the mandrel and injecting the coating material through the annular space between the pipe and the mandrel and thus into the space between the pipe and the sealed plastic film. Using heat shrinkable plastic the film forms a tightly fitting cover for the pipe coating material.

CROSS REFERENCE TO RELATED PATENT

This application is related to my U.S. Pat. No. 3,223,571; issued Dec. 14, 1965; entitled: Apparatus for Applying a Plastic Film Wrapping to a Pipe Line.

BACKGROUND OF THE INVENTION

1. Field of the invention

This invention is in the field of pipe coatings and protective wrappings. More particularly it is concerned with the application to long cylindrical tubes or pipes, of uniform circumferential coatings with selected materials, and the protection of the coatings by means of sealed wrappings with films of plastic, paper, etc. Still more particularly this invention is concerned with the simultaneous application of a continuous flexible plastic or synthetic film or wrap to a cylindrical object such as a pipe or conduit, and the injection of a circumferential coating of a selected material in the annular space between the object and the film.

2. Prior art

Pipelines are typically coated with a helically wound wrap of a chemically treated paper or similar protective material. The wrap is sometimes bound to the pipe by an undercoating of adhesive or similar material applied to the pipe by brush, or the like. This process is only workable when the applied coating is very thin, of the proper nature, and of the proper consistency. If thick coatings are applied by this method, pressure of the wrappings tends to distort the thickness and character of the coating, with unsatisfactory results.

SUMMARY OF THE INVENTION

This invention is based upon and is an improvement over my U.S. Pat. No. 3,223,571 in which a strip of plastic film is wrapped or formed about a pipe, to form a longitudinal overlapped seam, with the plastic film forming a complete and void-free protective coating. In this invention the pipe is surrounded by a coaxial cylindrical mandrel radially spaced from the pipe. The plastic film is formed and sealed to form a closed, substantially coaxial covering about the mandrel and pipe. The coating material is injected into the annular space between the pipe and the film covering. Then as the pipe moves through the mandrel, the cylindrical formed film goes with it and the injected coating material. If desired the film can be of a heat shrinkable composition, so that after injection of the coating material, the plastic film is caused to shrink into tight contact with the coating.

It is therefore an object of this invention to provide a method and apparatus for substantially simultaneously applying a uniformly thick coating of a selected material to a pipe or conduit and applying, forming, and sealing a layer of plastic film to contain and protect the applied coating.

It is a further object to accomplish this with a pipeline-traveling device or apparatus through which the pipe or conduit will traverse.

These and other objects and a better understanding of this invention will be apparent from the following description taken in conjunction with the appended drawings, in which:

BRIEF DESCRIPTION OF THE DRAWINGS

FIG. 4 is a sectional view taken along the line 4—4 of FIG. 2.

FIG. 5 is a diametrical section taken through the axis of the mandrel.

DESCRIPTION OF THE PREFERRED EMBODIMENTS

Figure 1:
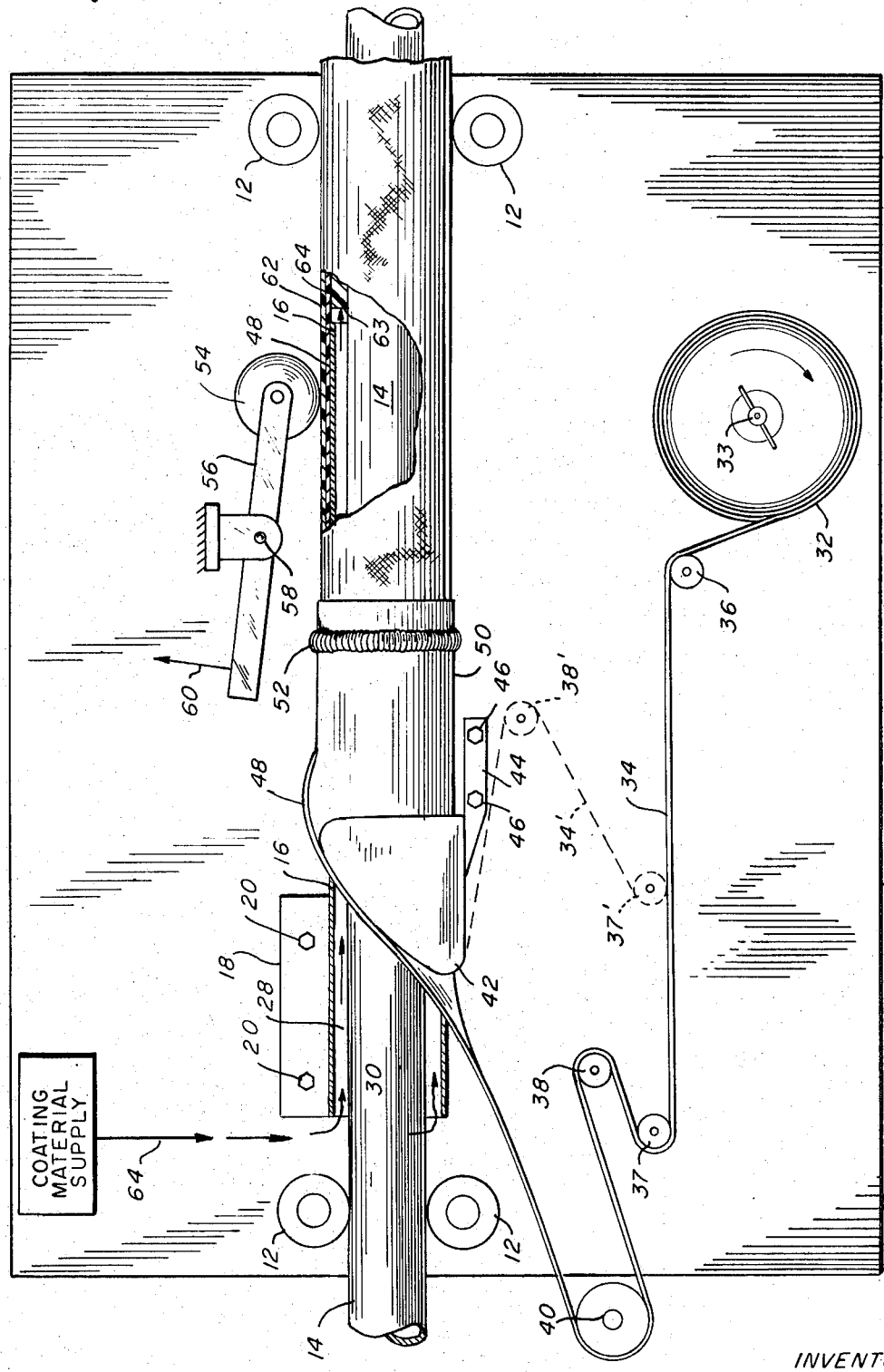
FIG. 1 is a general view of the apparatus of the method of this invention.

Referring to the drawings, FIG. 1 shows a general view of one embodiment of this invention. Numeral 10 refers to a frame adapted to support, or to be supported by a pipe or conduit 14 and adapted to be relatively traversed with respect to the pipe in the direction of the pipe. This is accomplished by means of rollers 12, which may simply be idlers, or they may be powered by motor means, not shown but well known in the art.

Mounted to the frame 10 by bracket 18 and bolts 20 is a thin-walled cylindrical mandrel 16 which is concentric with and spaced from the pipe. The purpose of the mandrel is to provide a form about which a strip of plastic or other sheet material can be formed and sealed into a thin-walled cylinder concentric with the pipe. The difference in diameter between the pipe and the plastic cylinder provides an annular space into which a selected coating material can be injected. Such a coating can be of any desired composition that has the required physical properties, such as foamed plastic, cement, aggregates of various types, etc.

Mounted on the frame 10 is a roll 32 of thin flexible film stock, ribbon, or wrapping material 34 with its axis 33 substantially transverse to the axis of the pipe. This strip can be taken from the roll, over rollers 36, 37, 38 and over transverse roller 40, turned back, and formed around the mandrel 16 by means of the folding device 42 which will be described in detail in accordance with FIGS. 2 and 3. As it passes through folder 42, the strip is wrapped around the mandrel with edges 48 overlapping. The folder 42 is fastened to the frame 10 by means of bracket 44 and bolts 46. The folder 42 has cylindrical leaf extensions 50 that assist in the forming of the overlapped edges of the plastic film.

The film 34 can be made from any material that is suitably foldable or flexible and retainable about the pipe and possessing the properties necessary for retaining the coating 64 and protecting the pipe and coating from corrosion, erosion and mechanical damage. In addition, the film or wrapping material is to be relatively strong and of low, or practically nil moisture-vapor-transmission characteristics, in addition to high insulating and dielectric properties. It has been found that many films having heat shrinkable characteristics generally possess desirable properties and are of excellent utility in this invention.

It is recognized that during the life of this patent there will be many advances in the technology of thin films, especially synthetic resin films, and in all probability, improved films and wrappings will be developed that can be incorporated within the features of this invention. Also, there are many materials presently available having the required properties. These include vinyl plastics such as polyvinyl chloride, polyvinylidine chloride, vinyl chloride acetate copolymers, and polyolefins such as polyethylene and many others. A number of these are enumerated in my U.S. Pat. No. 3,223,571.

These plastics while being waterproof, tough, flexible and easily foldable, also possess highly desirable dielectric properties. Accordingly, these plastic films when used in accordance with the invention not only prevent direct contact between the pipe and/or coating and ground or moisture, but also effectively insulate the pipe from stray electric currents.

Although these films are generally of a thickness equal to or less than ten thousandths of an inch, this figure is not an absolute upper limit of the usable thickness. Generally, the pipe size, coating thickness, foldability, type of film and type of film folder will be one, all or some of the determining factors in deciding the upper limit on the usable thickness of a particular film. It is possible in some cases to increase the usable thickness of a particular film beyond this upper limit, by preheating the film before folding or forming it about the pipe.

A film sealing means 54 in the shape of a wheel or roller is journaled on arm 56 pivoted at 58 and pressed into contact with the overlapped edges of the film. The pressure is applied between the mandrel 16 and the roller 54.

Sealing of the overlapped edges may be effected by applying a suitable adhesive material or film solvent to one of the two edges, and pressing the other edge against this adhesive or solvent strip. Another highly effective method of sealing the overlapped edges of a plastic film is by the application of heat to the area of overlap to weld the joint. Sufficient heat must be applied to cause the overlapped edges of the plastic to partially melt and their adjacent surfaces flow together. When the edges cool, a strong seal is effected between them. Heat for such purpose can be obtained from a heating element housed in the roller 54.

A relatively new means for sealing overlapped edges of a plastic film utilizes ultrasonic vibrations. For example, an ultrasonic vibrating member that is positioned such that it will traverse the area of overlap will seal the edges. Ultrasonic vibrations transmit energy through the overlapped edges of a plastic in such a way that the surfaces to be joined are brought within atomic distances of each other, and thus adhere positively without heat or adhesive.

It will be understood, of course, that any other plastic material such as treated paper and/or cloth can be used. Also other sealing means for effectively sealing the longitudinal edges of this film wrap may be used without departing from the scope of this invention. For example, while I speak of overlapped edges which are sealed together by means of cement, other adhesives, heat, etc., it will be clear that the edges need not overlap but can abut each other, or even be parallel and slightly spaced from each other, with a narrow strip of adhesive coated tape covering the joint and holding the edges in place. Conventional pressure sensitive tape can be used for this purpose.

In FIG. 1 I show the strip or ribbon 34 of plastic film being unrolled from roll 32. There is sufficient friction in support bearings 33 and in the rollers 36, 37, 38 so that the strip is pulled tight as movement of the frame 10 to the left, or the pipe 14 to the right, causes the strip to be rolled around roller 40. The folder 42 can be a simple frustoconical cylinder within which the pipe passes to the right, toward the portion of smaller diameter, causing the film to be pressed more closely and more tightly around the mandrel 16.

Alternatively the strip can be wound (as shown by the dashed line 34') around rollers 37' and 38' and then into the folder 42 which would then be a reversing folder. This reversing type folder obviates the need of the reversing roller 40. The folder described in my Pat. 3,223,-571 is of this type and I have patterned FIGS. 2, 3 and 4 after the correspondingly numbered drawings in Pat. No. 3,223,571.

Figure 2:
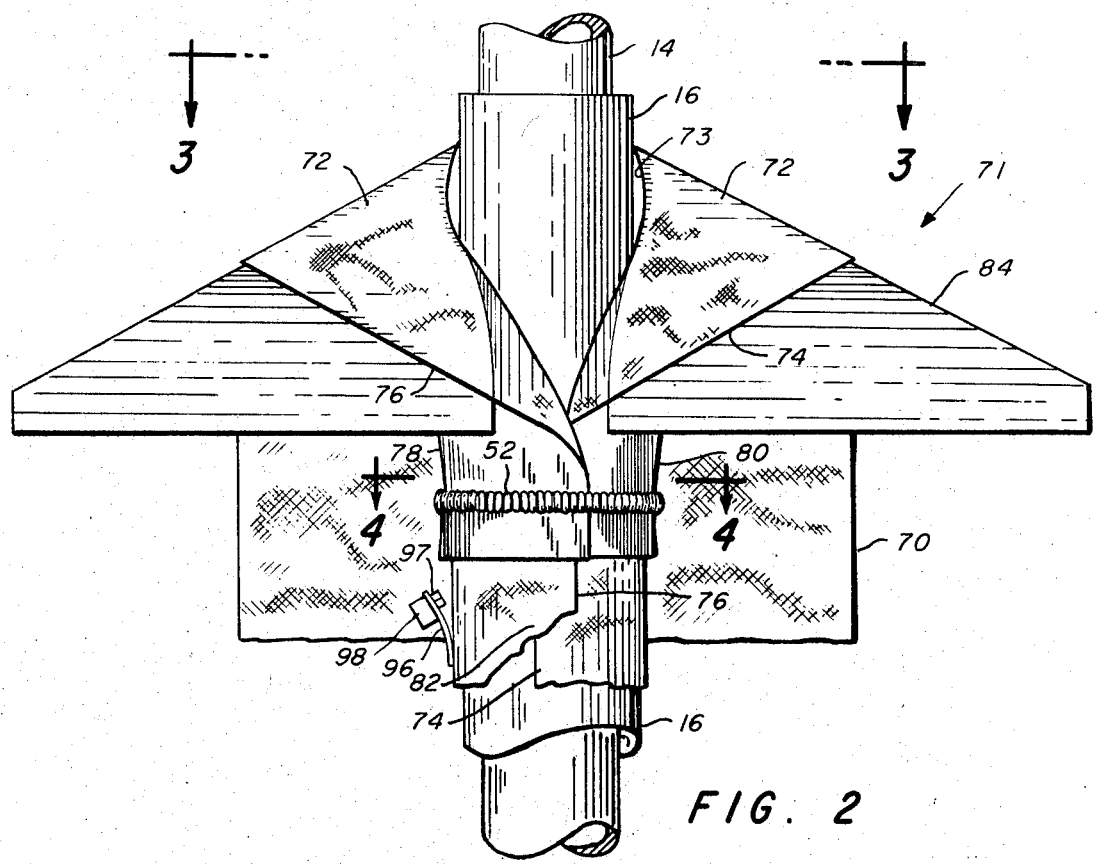
FIG. 2 is a top view of the folder of this invention.
Figure 3:
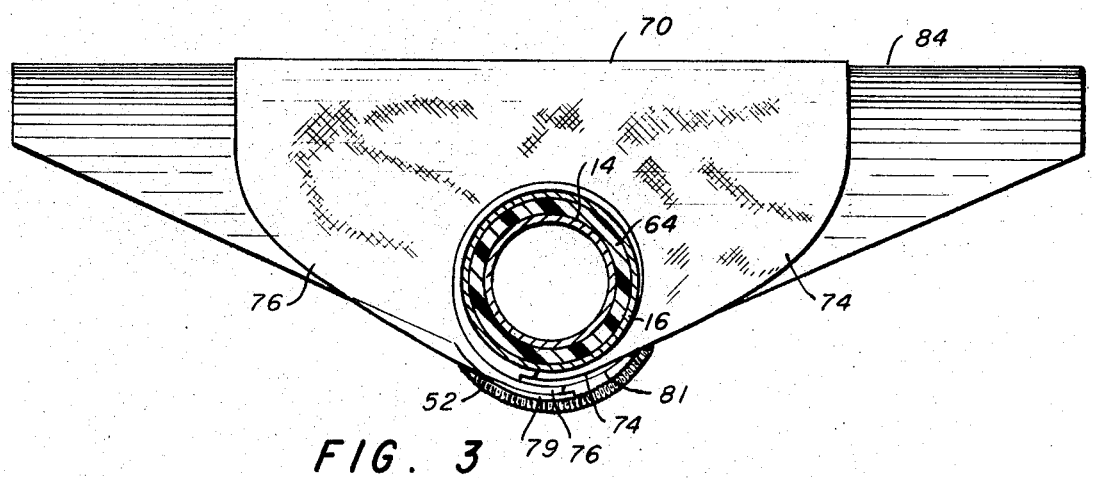
FIG. 3 is a front view of the film folding device as taken along 3—3 of FIG. 2.

Referring now to FIGS. 2, 3 and 4, film folder 71 surrounds the mandrel 16, while the pipe 14 passes through the mandrel coaxially. There is a selected radial spacing between the pipe and the mandrel which will determine the thickness of the circumferential coating on the pipe. The film folder 71 consists of a combination of a smooth curve, wing-shaped shoulder portion 84 and a rearward tubular portion 80. The shoulder portion 84 is made from a rigid material such as hard plastic or metal. A longitudinal circular opening 73 is provided in the curved surface 84 for the axial passage of the pipe 14 and mandrel 16 therethrough. The diameter of this opening is sufficiently larger than the diameter of the mandrel so that the wrapping of the film will not be too tight, and therefore generate too much friction.

As the fold and overlapping edges are formed the plastic film continuously moves to the right over the surface of the mandrel. Any means possible for reducing the friction of the movement of the plastic over the mandrel 16 can be used such as coating the outer surface of the mandrel with friction reducing materials such as Teflon-like material, or the use of sprays of powder or liquid to lubricate the movement of the plastic. Such powders and liquids are well known in the art and, of course, must be compatible with the material of the coating.

Extending rearwardly of shoulder portion 84 is a flexible tubular member, overlappingly split longitudinally to cause the final overlapping fold of the film 72 about the mandrel 16. The split forms two leaves, underneath portion 80 and overlapping portion 78 forming the end tabs 81 and 79 respectively. Tabs 81 and 79 are expansibly retained in their overlapped position either by inherent springiness or by one or more expansible circular spring elements 52. As the film ribbon is drawn over the smooth curved shoulder portion 84, it is automatically shaped into a continuous tubular wrap about mandrel 16. Film strip or ribbon 34' is of sufficient width that its edges overlap 82 when it is folded about the mandrel. Tabs 81 and 79 function as guide members for automatically guiding the longitudinal edges of the strip into the overlapped position. That is, one film strip edge, the inner one 74, will be drawn through the space between tab 81 and the exterior of the mandrel 16, and the other edge 76 will be drawn into and through the space between the tab 81 and overlapping tab 71.

Once the film has been formed and overlapped about the mandrel, they can be held in position by spring elements similar to 52 until the film passes the sealing means 54. Alternatively a plurality of circumferentially positioned leaf springs similar to 96 in FIG. 2 held by support 98 can be used to keep the film in position.

Referring now to FIG. 5, I show the coating material 64 being injected through the annular space between pipe 14 and mandrel 16 into the annular space between the film cylinder 62 and pipe 64 at point 63. The plastic film 62 is sealed by roller 54, or by other means before it leaves the mandrel. After the plastic leaves the mandrel and the coating material 64 is injected, heating means 86 irradiating 88 the film 62 will cause it to shrink and fit tightly to the coating as shown at 62'. While I show the use of a heat-shrinkable plastic material and a radiant heating means, it will be clear that this invention does not require such material, but can be used equally well with non-shrinking sheet film.

Although the invention has been described with particular emphasis on the use of synthetic materials as the wrapping material, it is to be understood that any other material possessing the necessary strength, protective, forming and sealing characteristics and capable of being formed from a continuous flat, flexible ribbon stage to a stage about the mandrel, can be used. Such other material may include a chemically treated, relatively moisture proof fibrous material, such as paper, glass, metal or metal foil, etc.

In using a coating of a foam creating material the exothermic heat of reaction in many instances is sufficient to weld and seal the films such as polyethylene without further aids.

Also, while I have described my invention in terms of a pipe or pipeline, it can be applied equally well to the coating of many other classes of long cylindrical objects, such as rods, wire and cable which is inclusive of the term "conduit" as used herein.

While I have described my invention with reference to specific preferred embodiments, it will be understood that many modifications may be made without departing from the spirit and scope of the invention. Thus, this invention should be construed not to be limited to the embodiments herein described but should be limited only by the scope of the appended claim or claims with each element or step being accorded the full range of equivalency to which it is entitled.

What is claimed:

1. Apparatus for simultaneously applying to a conduit a coating of selected material and a means for retaining said coating comprising:
    (a) a support frame;
    (b) means to axially move said conduit and said frame relatively to each other;
    (c) mandrel means surrounding and spaced from said conduit and supported coaxial therewith from said frame;
    (d) means, mounted on said frame, to supply a film strip in a direction colinear with and in synchronism with the movement of said conduit;
    (e) forming means supported by said frame and surrounding said mandrel for folding and wrapping said film to traverse between said mandrel and said forming means to create a cylindrical tubular form of selected diameter larger than said conduit about said conduit;
    (f) means to seal the edges of said film; and
    (g) means to inject said coating material into the annular space between said conduit and said film.

2. The apparatus as in claim 1 in which said folding and wrapping means comprises a reversing folding means.
3. The apparatus as in claim 1 in which said first end of said film means is supported by said conduit.
4. The apparatus as in claim 1 in which said means to supply said film strip comprises a roll of said film supported by said frame and rotatable about an axis transverse to said conduit.
5. The apparatus as in claim 1 in which said film means comprises a synthetic heat shrinkable film, and including means to heat said sealed film.
6. The apparatus as in claim 5 in which said means to seal includes thermal means.
7. The apparatus as in claim 1 wherein said means to inject includes injection of plastic foam material.
8. The apparatus of claim 7 in which said foam is chemically generated within said annular space.
9. Apparatus for applying a circumferential coating of foamed plastic to a rigid longitudinal cylindrical article, comprising:
    (a) a support frame;
    (b) means to cause relative axial movement of said support frame to said cylindrical article;
    (c) means to supply a non-metallic heat shrinkable film strip in a direction colinear with said article;
    (d) forming means surrounding said cylindrical article for forming, downstream thereof, said film strips into an unsupported cylindrical tubular form surrounding said article and of a selected diameter larger than said article forming an annulus;
    (e) means to seal or join the edges of said film strip; and
    (f) means to inject into said annulus between said article and said unsupported film tube the chemical materials required to form downstream of said forming means, in situ, and to fill said annulus with, foamed plastic.

References Cited
UNITED STATES PATENTS

| | | | |
|---|---|---|---|
| 3,432,582 | 3/1969 | Bender | 264—47 |
| 3,434,502 | 3/1969 | Snelling | 138—149 |
| 3,223,571 | 4/1962 | Straughan | 156—200 X |
| 3,406,248 | 10/1968 | Burish et al. | 264—173 X |
| 3,399,095 | 8/1968 | Hyland | 264—173 X |
| 3,354,244 | 11/1967 | Davidson | 264—173 X |

FOREIGN PATENTS

| | | | |
|---|---|---|---|
| 965,185 | 7/1964 | Great Britain | 264—47 |

ALFRED L. LEAVITT, Primary Examiner

C. WESTON, Assistant Examiner

U.S. Cl. X.R.

156—86, 200, 201, 212, 461; 264—173